US012617267B2

(12) United States Patent
Schmidt et al.

(10) Patent No.: US 12,617,267 B2
(45) Date of Patent: May 5, 2026

(54) DEVICE FOR REGULATING AN AIR FLOW

(71) Applicant: HBPO GmbH, Lippstadt (DE)

(72) Inventors: Ralf Schmidt, Oelde (DE); Daniel Knorr, Bielefeld (DE); Gaoming Zhao, Lippstadt (DE); Tobias Tegethoff, Lichtenau (DE); Steffen Höwelkröger, Delbrück (DE)

(73) Assignee: HBPO GmbH, Lippstadt (DE)

( * ) Notice: Subject to any disclaimer, the term of this patent is extended or adjusted under 35 U.S.C. 154(b) by 111 days.

(21) Appl. No.: 17/914,201

(22) PCT Filed: Mar. 5, 2021

(86) PCT No.: PCT/EP2021/055643
§ 371 (c)(1),
(2) Date: Sep. 23, 2022

(87) PCT Pub. No.: WO2021/190903
PCT Pub. Date: Sep. 30, 2021

(65) Prior Publication Data
US 2023/0145855 A1 May 11, 2023

(30) Foreign Application Priority Data
Mar. 23, 2020 (DE) .......................... 102020107958.3

(51) Int. Cl.
B60K 11/08 (2006.01)
(52) U.S. Cl.
CPC .................................. B60K 11/085 (2013.01)
(58) Field of Classification Search
CPC ... B60K 11/00; B60K 11/085; E06B 9/17046; E06B 9/42; E06B 9/388; E06B 9/78; E06B 9/46; F16B 5/0692
See application file for complete search history.

(56) References Cited

U.S. PATENT DOCUMENTS 4,170,810 A * 10/1979 Peleg .................... E04H 15/646
160/395
4,393,915 A * 7/1983 Olson .................... A47H 23/01
160/395

(Continued)

FOREIGN PATENT DOCUMENTS

DE 3522591 1/1987
DE 202004011476 U1 * 2/2005 .............. E06B 9/13

(Continued)

OTHER PUBLICATIONS

Machine translation DE102019212552 (Year: 2021).*
Machine translation DE202004011476 (Year: 2005).*
Machine translation DE202017102954 (Year: 2017).*

*Primary Examiner* — Abe Massad
*Assistant Examiner* — Jeremy C Ramsey
(74) *Attorney, Agent, or Firm* — Thorpe North & Western, LLP

(57) ABSTRACT

A device (2) for regulating an air flow for a front end module (1) of a motor vehicle, comprising a closing element (4) for closing air inlets (38) of a front end module (1) of a motor vehicle, a guide element (6) for guiding the closing element (4) during an opening and a closing movement of the closing element (4), a first and a second control element (8a, 8b) for controlling an opening and a closing movement of the closing element (4), a first and a second drive element (10a, 10b) for driving an opening and a closing movement of the closing element (4), wherein the first and second control elements (8a, 8b) comprise a multi-part integrated tension and tolerance compensation mechanism (12) for compensating a variable pretension of the first and second drive elements (10a, 10b) in order to ensure a substantially constant tension of the closing element (4).

29 Claims, 17 Drawing Sheets

(56) References Cited

U.S. PATENT DOCUMENTS

Figure 1:
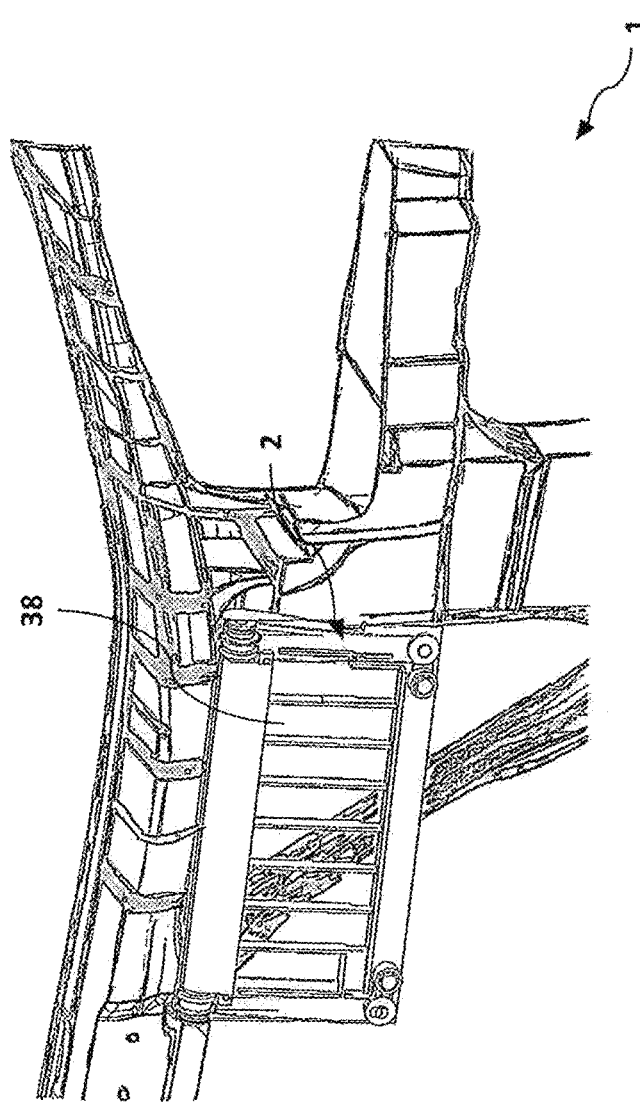

| | | | |
|---|---|---|---|
| 6,003,584 A | 12/1999 | Weinreich | |
| 6,135,189 A | 10/2000 | Weinreich | |
| 2003/0232590 A1 | 12/2003 | Okumura et al. | |
| 2018/0313146 A1* | 11/2018 | Blair ..................... | A47H 23/01 |
| 2019/0009667 A1* | 1/2019 | Steffen ..................... | F01P 7/12 |
| 2019/0145164 A1* | 5/2019 | Wulff ..................... | E06B 9/72 |
| | | | 160/405 |
| 2020/0339395 A1* | 10/2020 | Kicher ............... | B65H 75/4486 |

FOREIGN PATENT DOCUMENTS

| | | | | |
|---|---|---|---|---|
| DE | 10 2009 043 028 A1 | 3/2011 | | |
| DE | 10 2014 109 342 A1 | 1/2016 | | |
| DE | 202017102954 U1 * | 6/2017 | .......... | B60K 11/085 |
| DE | 102017120631 | 3/2019 | | |
| DE | 10 2019 117 120 A1 | 12/2020 | | |
| DE | 10 2019 122 162 A1 | 2/2021 | | |
| DE | 102019212552 A1 * | 2/2021 | .......... | B60K 11/085 |
| EP | 2131003 | 12/2009 | | |
| WO | 2011038715 | 4/2011 | | |

* cited by examiner

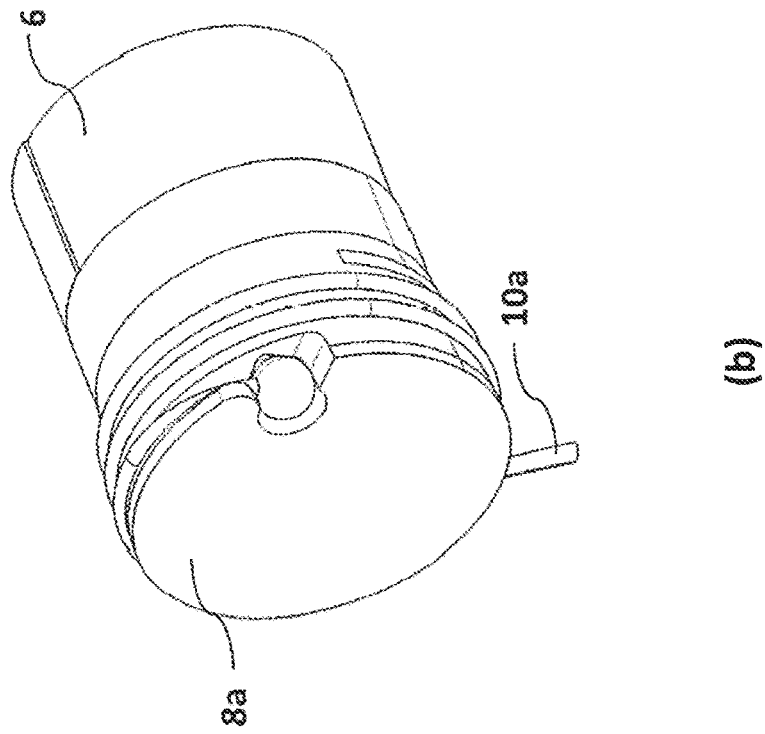
(b)
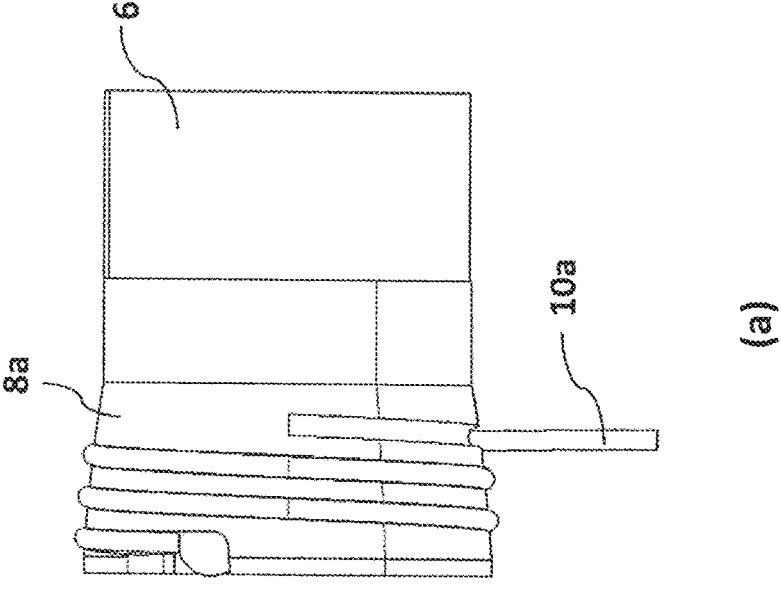
(a)
Fig. 9

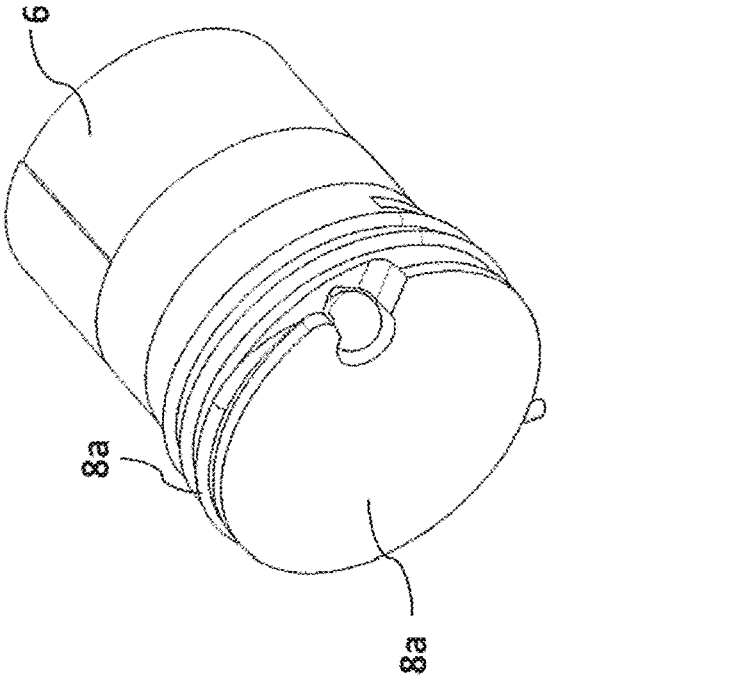
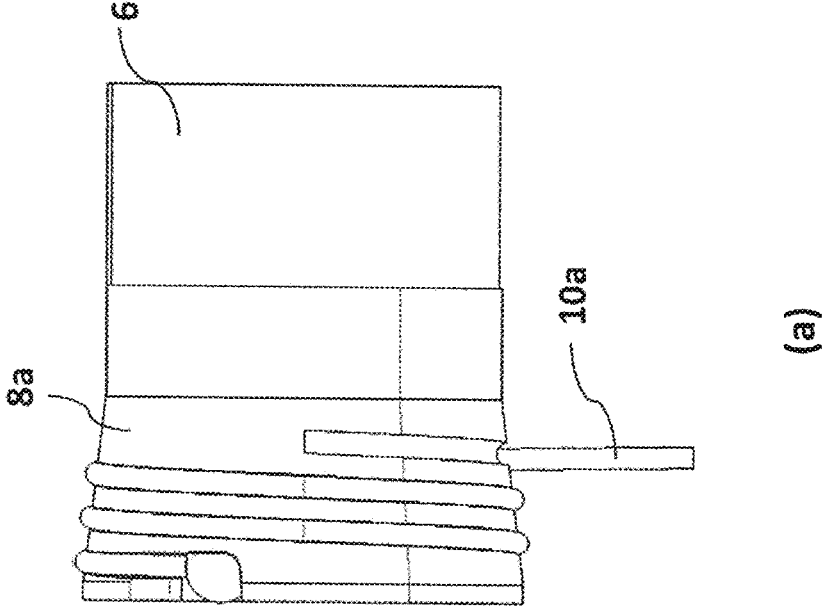
Fig. 10 (a)  (b)

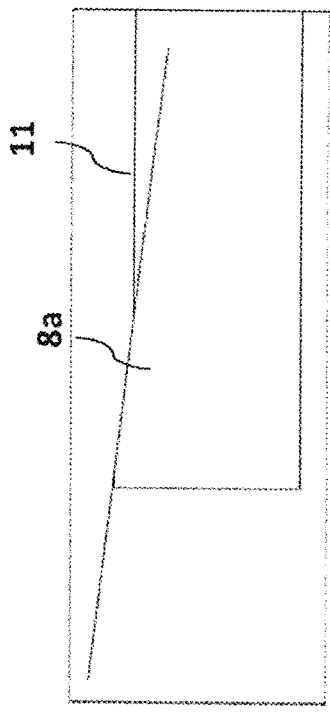
(b)
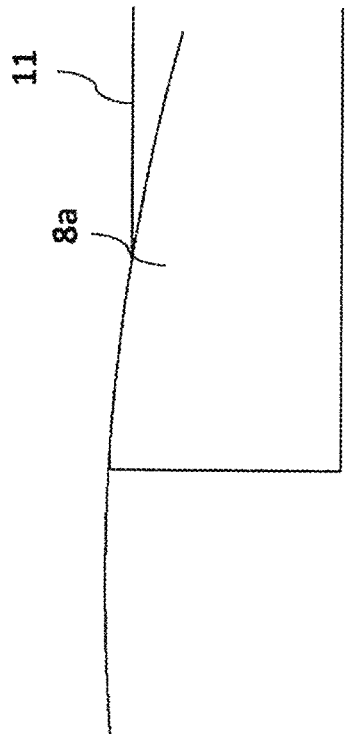
(a)
Fig. 11

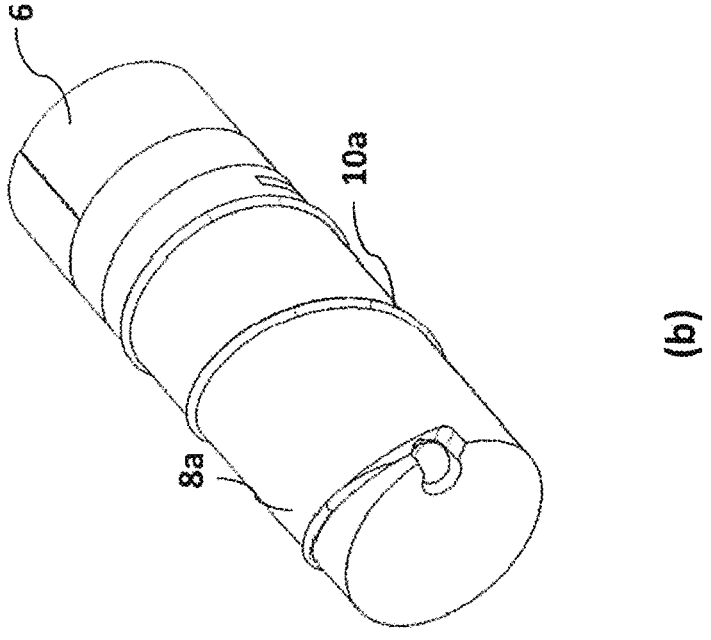
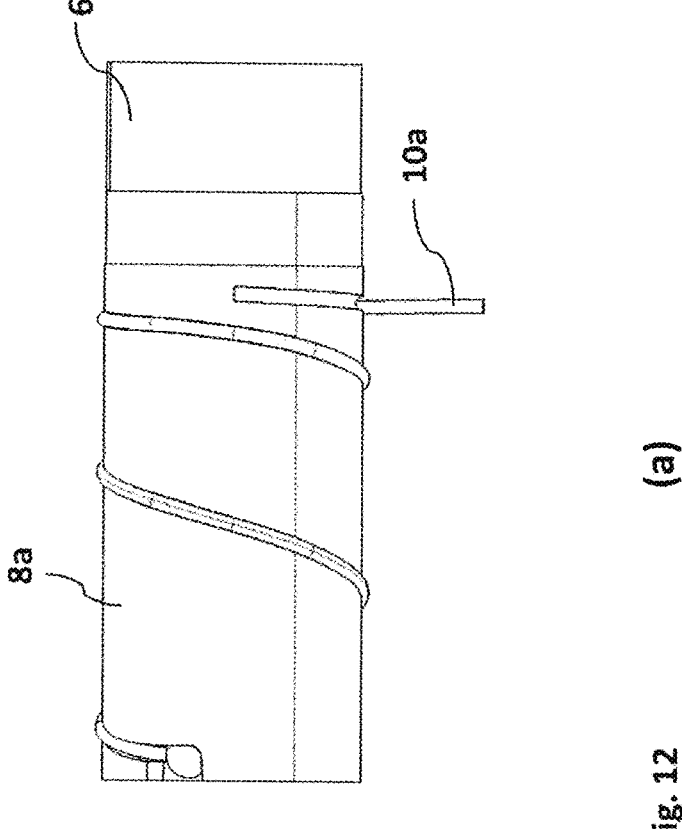
Fig. 12

B – B

B - B

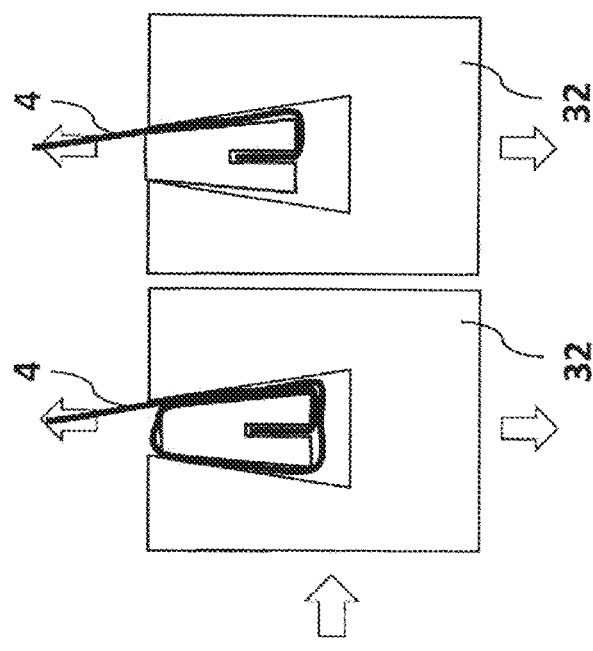
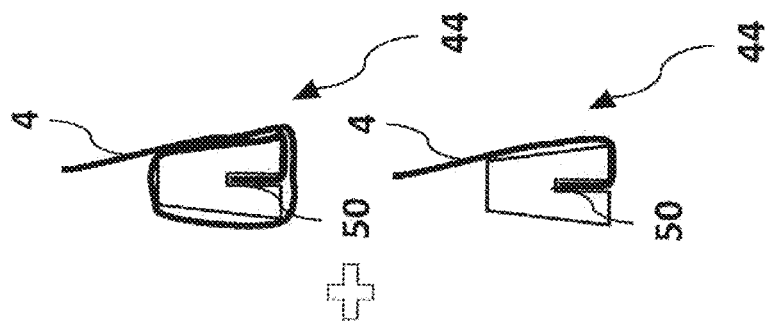
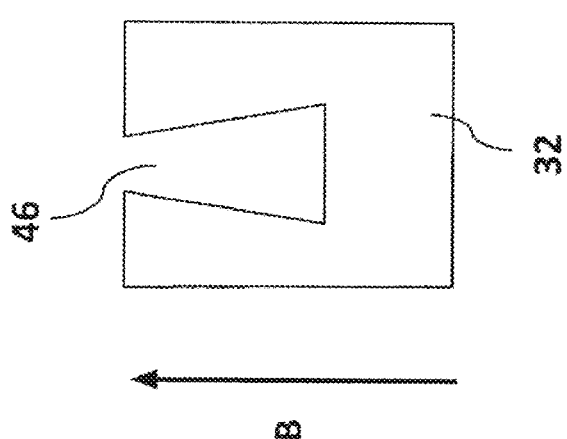
Fig. 16

DEVICE FOR REGULATING AN AIR FLOW

RELATED APPLICATIONS

This application is a national stage application of PCT Application No. PCT/EP2021/055643 filed May 5, 2021 which claims priority to German application 10 2020 107 958.3 filed Mar. 23, 2020.

SUMMARY

The present invention relates to a device for regulating an airflow for a front module of a motor vehicle, and to a motor vehicle comprising such a device.

In modern motor vehicles, fresh air flowing through a radiator grille of the vehicle or through the openings of the radiator grille is channelled and directed onto a cooling module of the vehicle. In particular, this targeted channelling of the air flow onto the cooling module can ensure that, according to the design/configuration of the cooling module, for example an engine of the vehicle and/or charge air for this engine, can be efficiently cooled and/or the interior of the vehicle can be efficiently air-conditioned.

Adversely, turbulent flows are generated by the inflowing air flow, which counteract the locomotion of the vehicles concerned and lead to reduced ranges or increased fuel consumption. In order to solve this problem, roller blind systems are known from the prior art which can close the air inlets arranged within the engine compartment if required and can thus reduce the generation of turbulent flows.

However, the systems known from the prior art for regulating an air flow for a front end module of a motor vehicle often have the problem that a constant material tension of the closing means/elements can only be ensured with difficulty, which leads to the fact that the air inlets arranged within the engine compartment can only be closed insufficiently well in some cases and thus the generation of turbulent flows can also only be reduced insufficiently. The reasons for the insufficiently constant material stresses are usually component-specific tolerances, diameter differences when winding and unwinding the roller blind systems and, in particular, signs of wear on individual components.

It is therefore the object of the present invention to at least partially overcome the aforementioned disadvantages of known devices for regulating an air flow for a front end module of a motor vehicle. In particular, it is the task of the invention to provide a device for regulating an air flow for a front-end module of a motor vehicle, which device enables the most effective and reliable reduction of turbulent flows possible in a structurally simple and inexpensive manner, and is designed/configurated in a particularly flexible and adaptable manner.

The foregoing problem is solved by a device having the features of the independent device claim and a motor vehicle comprising such a device. Further features and details of the invention result from the respective sub claims, the description and the drawings.

According to the invention, there is a device provided for regulating an air flow for a front end module of a motor vehicle, comprising a closing means/element for closing air inlets of a front end module of a motor vehicle, a guide means/element for guiding the closing means/element during an opening and a closing movement of the closing means/element, a first and a second control means/element for controlling an opening and a closing movement of the closing means/element, and a first and a second drive means/element for driving an opening and a closing movement of the closing means/element. According to the invention, the device for regulating air flow is characterized in this respect in that the first and second control means/elements comprise a multi-part integrated tension and tolerance compensation mechanism for compensating a variable bias of the first and second drive means/elements to ensure a substantially constant tension of the closing means/element.

The present device for regulating air flow for a front end module of a motor vehicle can preferably be arranged in the front region of a motor vehicle, in particular, between a radiator grille or a front hood and a motor vehicle cooling module. In addition to an application in passenger cars and trucks, the device according to the invention can equally be applied in other motorized motor vehicles, such as ships or flying objects or the like. Preferably, an opening operation and a closing operation of a closing means/element may be performed by an interaction between the subject control means/elements, the drive means/elements and the guide means/element according to the invention in order to close or open air inlets arranged along a motor vehicle height. Such air inlets may be formed, for example, in the form of brake air ducts or supply air ducts for the engine compartment or for an air conditioning system or the like.

According to the invention, the present guide means/element is preferably arranged between the first and the second control means/element, in particular, directly between the first and the second control means/element. In the context of the invention, an open position is understood to mean in particular a state in which the closing means/element is completely wound onto the guide means/element and air can penetrate the front end module virtually unhindered. Accordingly, in the context of the invention, a closed position is understood to mean in particular a state in which the closing means/element is completely unwound from the guide means/element and the path for the inflow of air is at least partially, preferably completely, blocked. In the context of the invention, a substantially constant tension of the closing means/element is understood to mean, in particular, a substantially constant tensile stress on the closing means/element, which results in particular in substantially constant and preferably optimum aerodynamic properties and, in particular, in a preferably effective reduction of turbulent flows. In this context, a constant pretension is particularly important in order to prevent "fluttering" of the closing means/element in the airstream as well as the formation of folds or the like, and thus to ensure a clean winding. In the context of the invention, a multi-part arrangement is understood to mean, in particular, an arrangement formed from a plurality of separately manufactured parts which can be connected to one another in a form-fitting, non-positive or material-fitting manner.

Within the scope of the invention, it has been recognized that by arranging a tension and tolerance compensation mechanism according to the invention, a variable pretension of present drive means can be compensated, so that a substantially constant tensile stress on a closing means/element according to the invention can be ensured even under varying environmental and system conditions. In particular, the multi-part design/configuration provided according to the invention makes it possible to make adjustments to the wear of parts of the object device in a structurally simple and quick manner, which additionally improves the sustainability of object systems for regulating air flow.

Within the scope of a structurally simple design/configuration and a simultaneously effective power transmission, it can be provided in particular according to the invention that the first and second control means/element have receiving means/elements arranged at the ends with a receiving area for receiving the drive means/elements, wherein the receiving means/elements are preferably identically formed. In this case, the drive means/elements can preferably be guided or directed over the receiving area of the receiving means/elements while ensuring the lowest possible static friction.

In order to guarantee the simplest, flexible and adaptable connection possible of the control means/elements to the guide means/element, it is further conceivable that the control means/elements each have a connecting means/element for connecting the receiving means/elements to the guide means/element, the connecting means/elements preferably being connectable to the guide means/element in a form-fitting manner, the connecting means/elements differing in particular at least partially in their shape.

Within the scope of a structurally simple embodiment, it may further be provided according to the invention that the tensioning and tolerance compensation mechanism is connected to the drive means/elements, preferably is engaged with the drive means/elements.

With regard to a simple, inexpensive and adaptable possibility of compensating for a variable preload, it can be further provided in an objectively advantageous manner that the tension and tolerance compensation mechanism has at least one elastic means/element for compensating for a variable preload, the elastic means/element preferably being formed in the form of a spring means/element, in particular in the form of a torsion spring.

Here, in the context of an application according to the invention, it is advantageously conceivable that the spring force of the elastic means/element is between 28 and 22 N, preferably between 26 and 24 N, specifically 25 N.

Within the scope of a constructively simple possibility of ensuring a releasable fixation of an elastic means/element within an objective control means/element, it can be provided in an objectively advantageous manner, in particular that the tensioning and tolerance compensation mechanism has at least one front and one rear retaining point for fixing a front and a rear end of the elastic means/element, the retaining points preferably being formed in the form of recesses and/or projections.

In this respect, it is advantageously conceivable that the front retaining point is arranged within the receiving means/elements, the front retaining point preferably being formed in the form of an elongate recess for the insertion of the front end of the elastic means/element.

At the same time, it is also conceivable that the rear retaining point is arranged within the connecting means/elements, the rear retaining point preferably being formed in the form of an elongate recess for the insertion of the rear part of the elastic means/element.

In order to create a structurally particularly simple form of ensuring compensation for signs of wear of parts of the device according to the invention for regulating air flow, it can be further provided for the purpose of the present invention that a plurality of front and/or rear retaining points are provided for ensuring the setting of different spring pretensioning forces, the front and/or rear retaining points preferably being distributed symmetrically, in particular being arranged symmetrically along a sectional plane of the receiving means/elements and/or of the connecting means/elements. In this case, the retaining points can be formed, in particular in the form of an adjustment mechanism for compensating for signs of wear.

In order to minimize wear of the parts of a device for regulating air flow, in particular of the elastic means/elements, it is also conceivable that the receiving means/elements and/or connecting means/elements comprise limiting means/elements for limiting a working range of the elastic means/elements, the limiting means/elements preferably comprising end stop surfaces for limiting a working range, in particular being formed in the form of recesses and corresponding projections.

In order to ensure a substantially constant tension of the closing means/element in different opening and closing states and thus to prevent a possible cause of insufficiently closed air inlets, it may be further provided for the present purpose that the first and second control means/elements are formed in such a way that a diameter increase and diameter decrease of the guide means/element caused by the winding and unwinding of the closing means/element is compensated for in order to minimize a difference in the web speed during the winding of the closing means/element and the unwinding of the drive means/elements and during the winding of the drive means/elements and the unwinding of the closing means/element.

Within the scope of such a compensation of a diameter increase and diameter decrease caused by the winding and unwinding of the closing means/element, it can be advantageously provided that the first and second control means/element have a varying diameter for compensating a diameter increase and diameter decrease of the guide means/element caused by the winding and unwinding of the closing means/element, wherein the first and second control means/element preferably have a barrel-shaped geometry or a frustoconical geometry. A barrel-shaped geometry here exhibits an at least partially parabolic cross-section, whereas a frustoconical geometry exhibits in particular a linear slope in cross-section.

In order to ensure precisely controllable guidance of the drive means/elements in such an embodiment with varying diameter of the control means/elements, it is particularly conceivable that the first and second control means/elements have a winding spiral for receiving the drive means/elements, the winding spiral preferably having a constant pitch.

Within the scope of a compensation of a diameter increase and diameter decrease caused by the winding and unwinding of the closing means/element, it can alternatively also be provided that the first and second control means/elements have a constant diameter, wherein the first and second control means/elements preferably have a cylindrical geometry. To ensure precisely controllable guidance of the drive means/elements, it is particularly conceivable in an embodiment with a constant diameter of the control means/elements that the first and second control means/elements comprise a winding spiral for receiving the drive means/elements, wherein the winding spiral has a variable pitch for compensating for a diameter increase and diameter decrease of the guide means/element caused by the winding and unwinding of the closing means/element. By adapting the shape and geometry of the control means/elements, it is possible in particular to use the most suitable geometry for the winding area of the tensile material for the particular installation situation. In this context, the geometry can depend on various factors, such as the available installation space or additional components.

In order to ensure that the drive means/elements are guided with as little wear as possible and in a flexible manner, it can also be provided in accordance with the invention that a first and a second diverting means/element are provided for diverting the drive means/elements, the diverting means/elements preferably being formed in the form of diverting rollers.

In order to achieve a stable arrangement of the individual components as well as reliable control of the present closing means/element, it can also be provided according to the invention that a frame is provided for receiving the diverting means/elements, the frame preferably having two lateral frame parts for guiding the diverting means/elements as well as a lower frame part for arranging a terminating strip. In this case, the lateral frame parts are preferably detachably connected or connectable to the lower frame part, in particular detachably connected or connectable in a form-fitting or force-fitting manner.

In view of a simple and compact arrangement as well as a simultaneously precise and effective control of the closing means/element during an opening movement and a closing movement, it may further be provided in the context of the invention that the frame is additionally provided for supporting the closing means/element, wherein the frame preferably comprises a grid-like structure for supporting the closing means/element.

In order to create a simple, reliable and at the same time inexpensive manner of releasably fixing a closing means/element within an object device for regulating an air flow, it can be provided according to the invention in particular that the frame and/or the guide means/element is positively and/or non-positively connected to the closing means/element, the closing means/element preferably being releasably connected to the frame and/or the guide means/element via a clamping connection. In the context of a clamping via a clamping connection, a closing means/element is preferably fixed via the generation of an increased frictional force.

With regard to a detachable connection between a closing means/element and an object device for regulating air flow which can be easily produced in terms of design/configuration, it is in particular conceivable in this case that a mounting means/element is provided for connecting the frame and/or the guide means/element to the closing means/element, the mounting means/element preferably having at least one slot recess for introducing the closing means/element, in particular having at least two slot recesses.

In this case, the mounting means/element can be formed into several parts, preferably at least three parts.

Within the framework of a simultaneously simple and reliable fastening, it can be advantageously provided that the frame and/or the guide means/element have a recess arranged on the longitudinal side for the insertion of the closing means/element and of the mounting means/element, the recess preferably being designed/configured in such a way that the closing means/element, when arranged within the recess, is fixed to the frame and/or the guide means/element together with the mounting means/element in a manner such that it cannot be lost in the loading direction of the closing means/element. For fastening the closing means/element to the frame and/or the guide means/element, the closing means/element can in this case be inserted and positioned, for example, through the slot recess or the slot recesses of the mounting means/element, before the mounting means/element, together with the inserted part of the closing means/element, is inserted laterally into the longitudinally arranged recess of the frame and/or of the guide means/element, so that the closing means/element is fixed to the frame and/or the guide means/element in a manner such that it cannot be lost in the loading direction of the closing means/element. In this case, the closing means/element can also be pushed through two gaps for secure fixing and, in a multi-part design/configuration of the assembly means/element, can also be guided past parts of the assembly means/element on both sides, for example, for greater force transmission.

In this case, it is conceivable, within the framework of a simultaneously stable and easy-to-manufacture fastening, that the recess is of wedge-shaped design/configuration and the mounting means/element is at least partially designed/configured to correspond in shape to the wedge-shaped recess, in order to prevent the closing means/element from being pulled out in the loading direction of the closing means/element. In this regard, the mounting means/element may preferably also be at least partially wedge-shaped so that it can be positively secured within the recess. In the context of a multi-part design/configuration, for example, only individual parts can be wedge-shaped.

In this case, it is particularly conceivable that the assembly means/element is formed in three parts, the assembly means/element having a first cuboidal part and a second and third part which are formed at least partially in a shape corresponding to the recess, the parts preferably being formed and arrangeable within the recess in such a way that the arrangement of the second and third parts forms a gap for the closing means/element to pass through, the diameter of which is smaller than the diameter of the first cuboidal part, so that pulling out of the closing means/element in the loading direction of the closing means/element is prevented when the cuboidal part is wrapped with the closing means/element and the wrapped cuboidal part is arranged in the recess.

In the context of a particularly reliable fixation of the closing means/element, it can be provided here in particular that the mounting means/element has a recess for partial insertion of the closing means/element, the recess preferably having clip connections for fixing the closing means/element in the recess. In this way, the closing means/element can be fixed in the mounting means/element, for example, and can be wrapped around the mounting means/element one or more times for secure fixing before the part of the closing means/element wrapped with the mounting means/element is preferably pushed laterally into the recess of the frame or of the guide means/element. In this case, the recess can be of wedge-shaped or cuboid-shaped design/configuration, with it being possible for the recess, in the case of a cuboid-shaped design/configuration, to have a latching projection to prevent the part of the closing means/element which is connected to the mounting means/element from being detached in the loading direction.

In order to ensure a design/configuration of a drive of the present closing means/element which is both flexible and easy to integrate in terms of construction, it can also be provided in an advantageous manner according to the invention that the first and second drive means/elements are in the form of cable pulls, in particular in the form of Bowden cables. A design/configuration of the drive means/elements in the form of Bowden cables is particularly suitable in this case with regard to a particularly robust design/configuration of the device in question.

With regard to a space-saving and compact arrangement as well as a simultaneously effective and low-wear guidance of the closing means/element during an opening and a closing movement, it can be advantageously provided within the scope of the invention that the guide means/element is formed in the form of a winding shaft onto which the closing means/element can be wound during an opening movement and from which the closing means/element can be unwound during a closing movement.

In the context of simple and inexpensive production, in particular for mass production, it can also be provided in accordance with the invention that the guide means/element is formed in the form of an extruded profile, preferably in the form of an extruded hollow profile. By means of common extrusion processes, even complex hollow profile-shaped structures can be produced in a single working step.

In order to ensure a simple, compact and material-saving connection between the present guide means/element and the control means/elements according to the invention, it is particularly advantageous if the guide means/element has two recesses arranged on the outer sides for receiving the control means/elements. The recesses may already be provided in the guide means/element in the form of an extruded profile or may be created by additional machining of the guide means/element.

In the context of a particularly simple type of connection between the guide means/element and the control means/elements, it can furthermore be provided in particular that the recesses arranged on the outer sides are designed/configured to correspond in shape to the outer shape of the control means/elements.

With regard to a particularly lightweight embodiment of the device according to the invention, it may further be provided that the guide means/element is formed from a lightweight material having a density of less than 3 g/cm³, the lightweight material being in particular an aluminium material and/or plastic.

With regard to a structurally simple introduction and control of a closing means/element via two control means/elements, it may also be advantageously provided according to the invention that the guide element is arranged between the first and second control means/elements in such a way that the main alignment axis of the guide means/element is aligned substantially perpendicular to the opening and closing movement of the closing means/element.

In view of a simple and compact arrangement as well as a simultaneously precise and effective control of the closing means/element during an opening movement and a closing movement, it may further be provided in the context of the invention that the control means/elements are connected to the closing means/element via the drive means/elements, the connection preferably being such that the drive means/elements are wound up by the control means/elements during an opening movement and are unwound from the control means/elements during a closing movement.

In order to enable remotely controllable opening and closing of a closing means/element, it is further advantageous if a drive means for driving the drive means/elements is provided. Here, the drive means can preferably be in the form of an actuator, in particular in the form of a rotary actuator.

Also, an object of the invention is a front end module for a motor vehicle, comprising a device described above for regulating air flow for a front end module.

Also, an object of the invention is, moreover, a motor vehicle comprising a device for regulating air flow for a front end module described above, in particular, a front end module for a motor vehicle described above.

Further advantages, features and details of the invention will be apparent from the following description, in which embodiments of the invention are described in detail with reference to the drawings. In this connection, the features mentioned in the claims and in the description may each be essential to the invention individually or in any combination.

Figure 2:
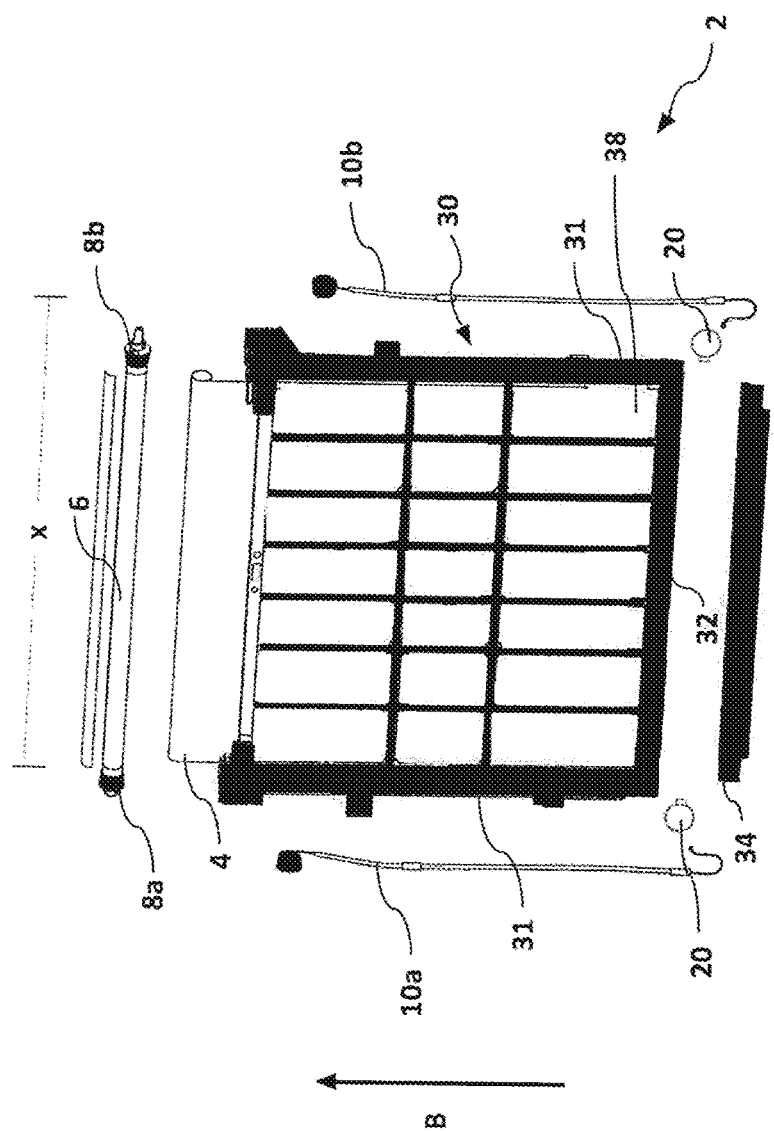
Figure 3:
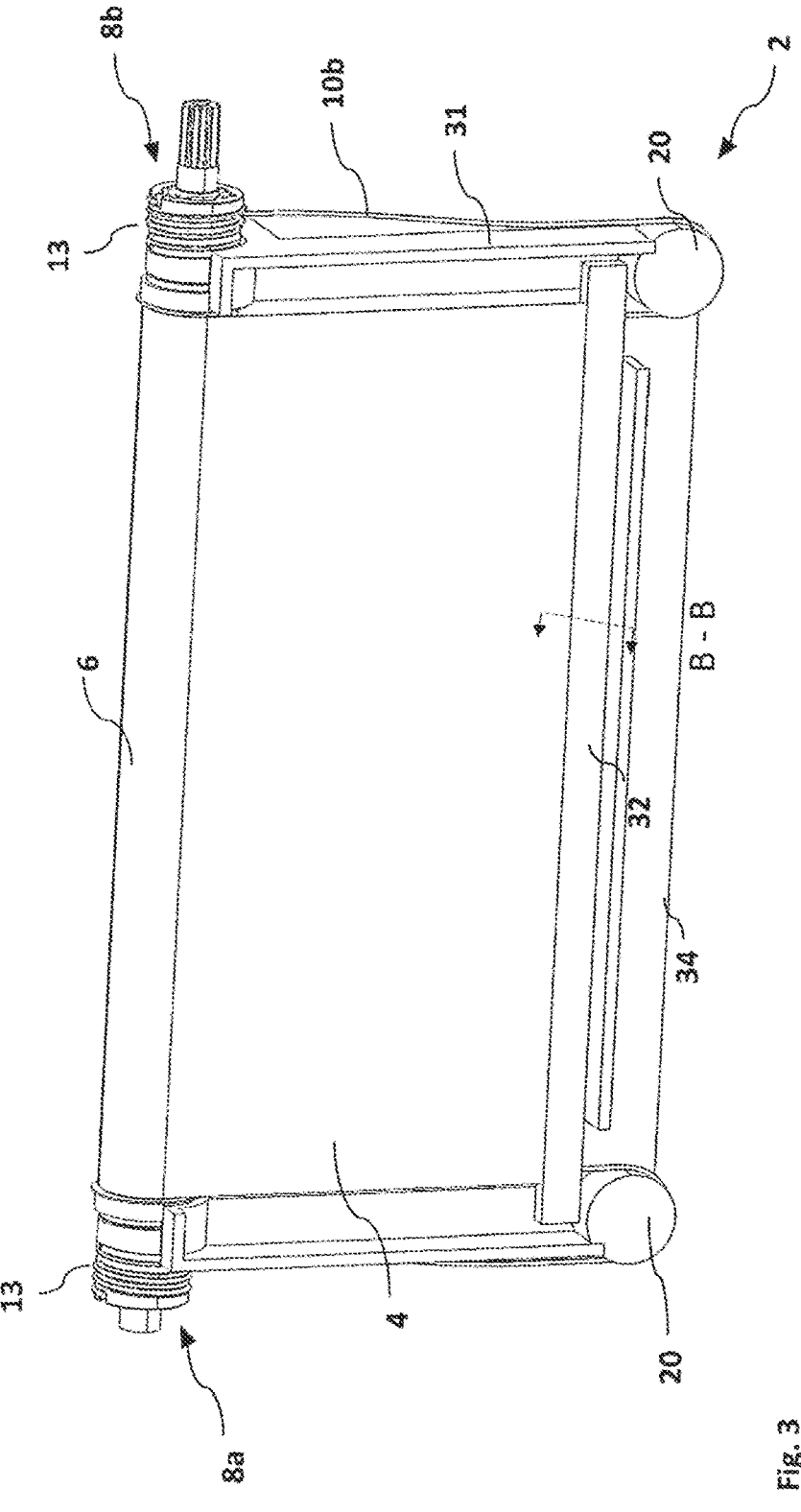
Figure 4:
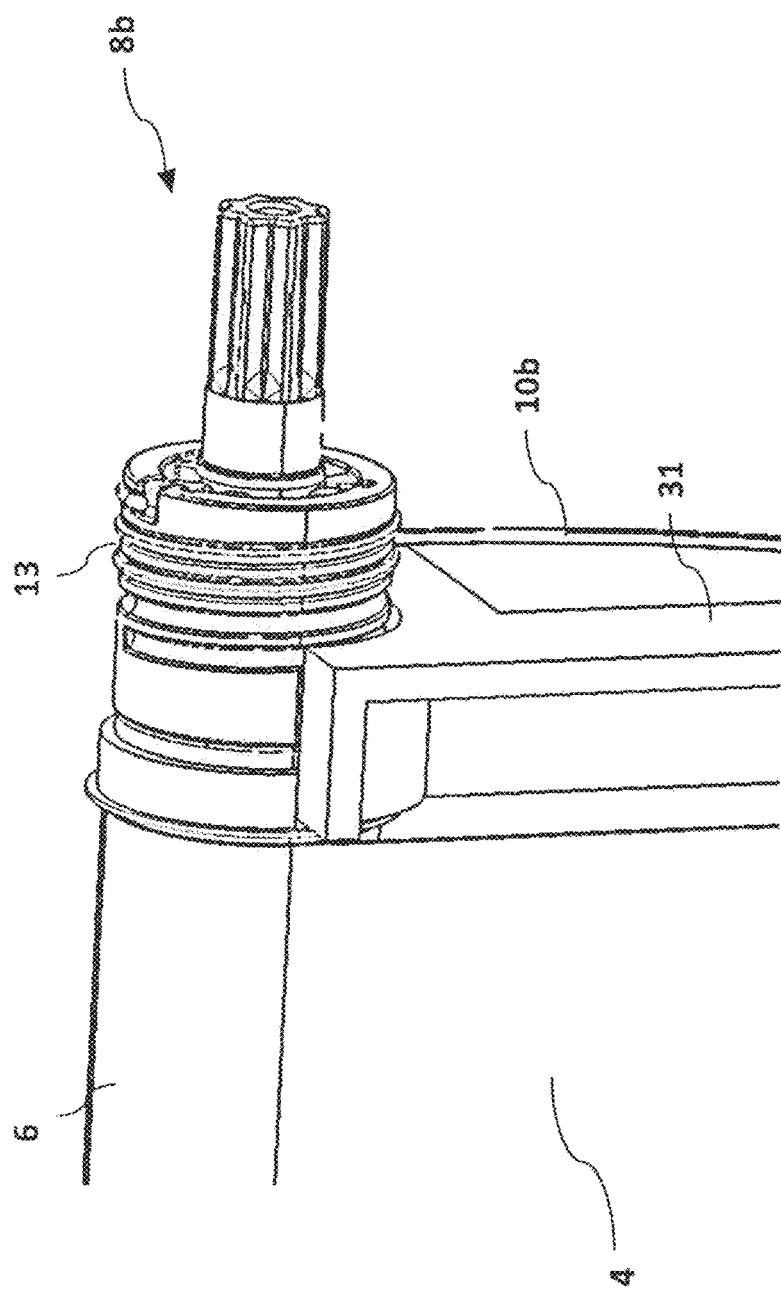
Figures 5A, 5B:
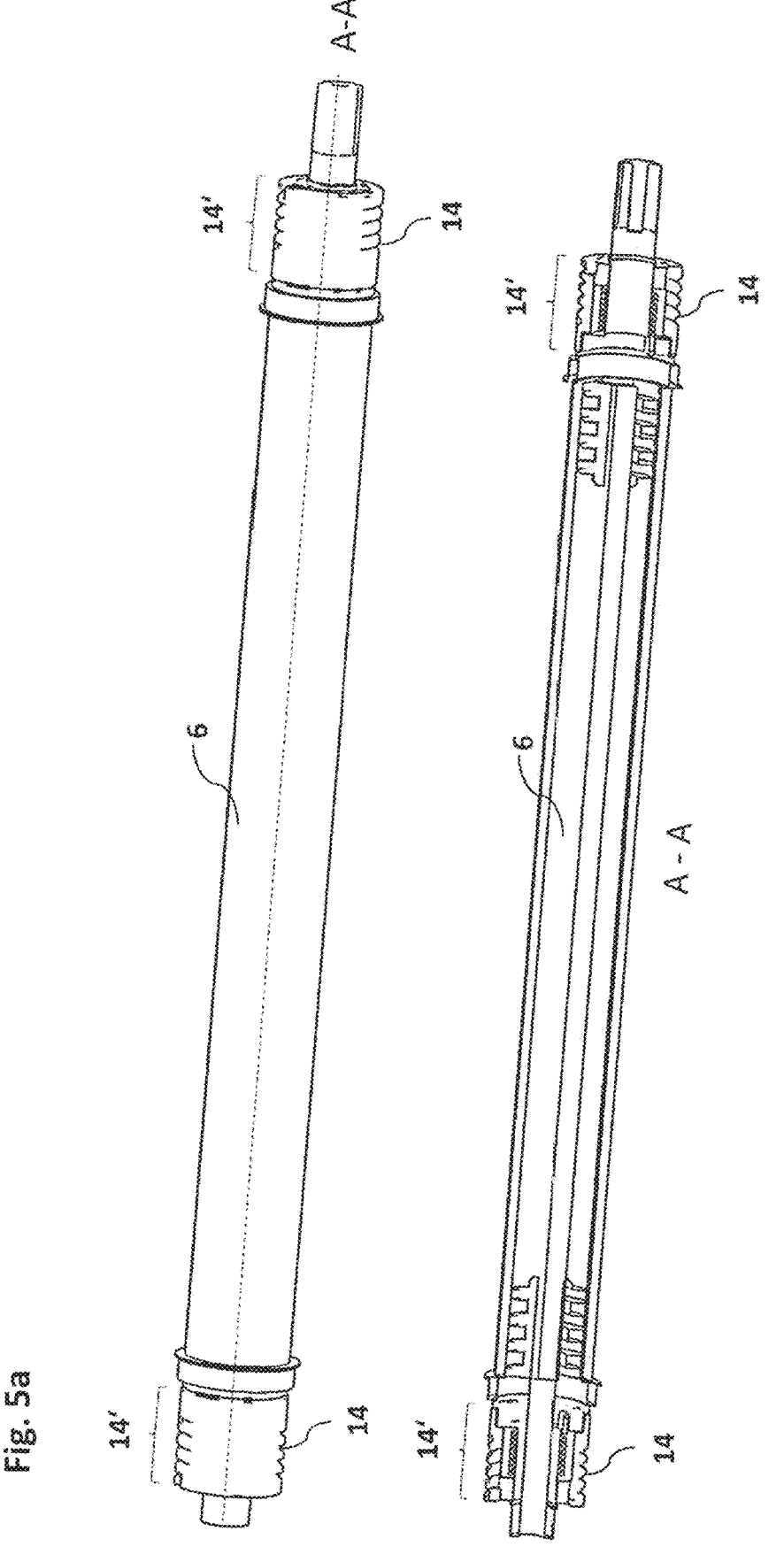
Figure 6:
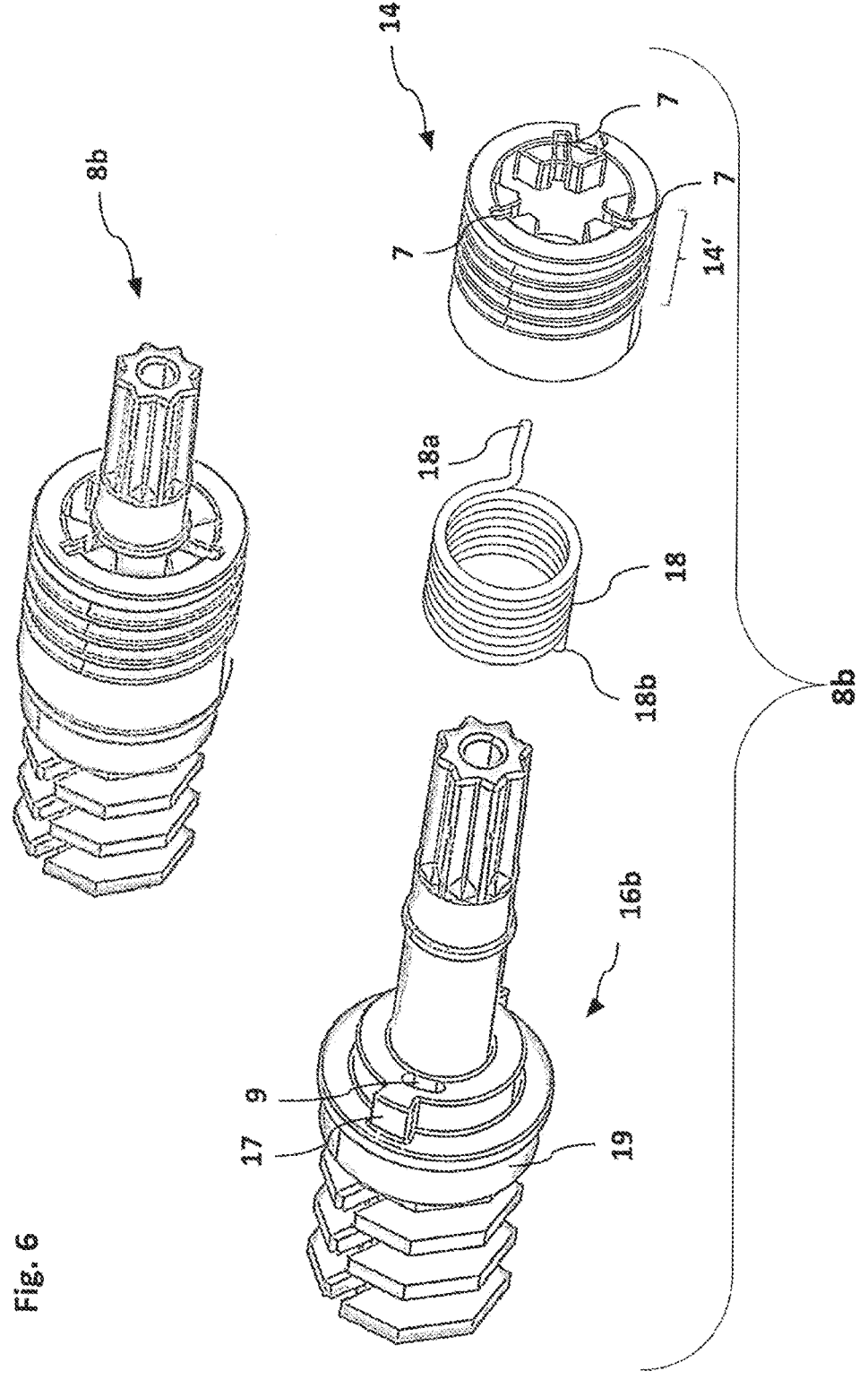
Figure 7:
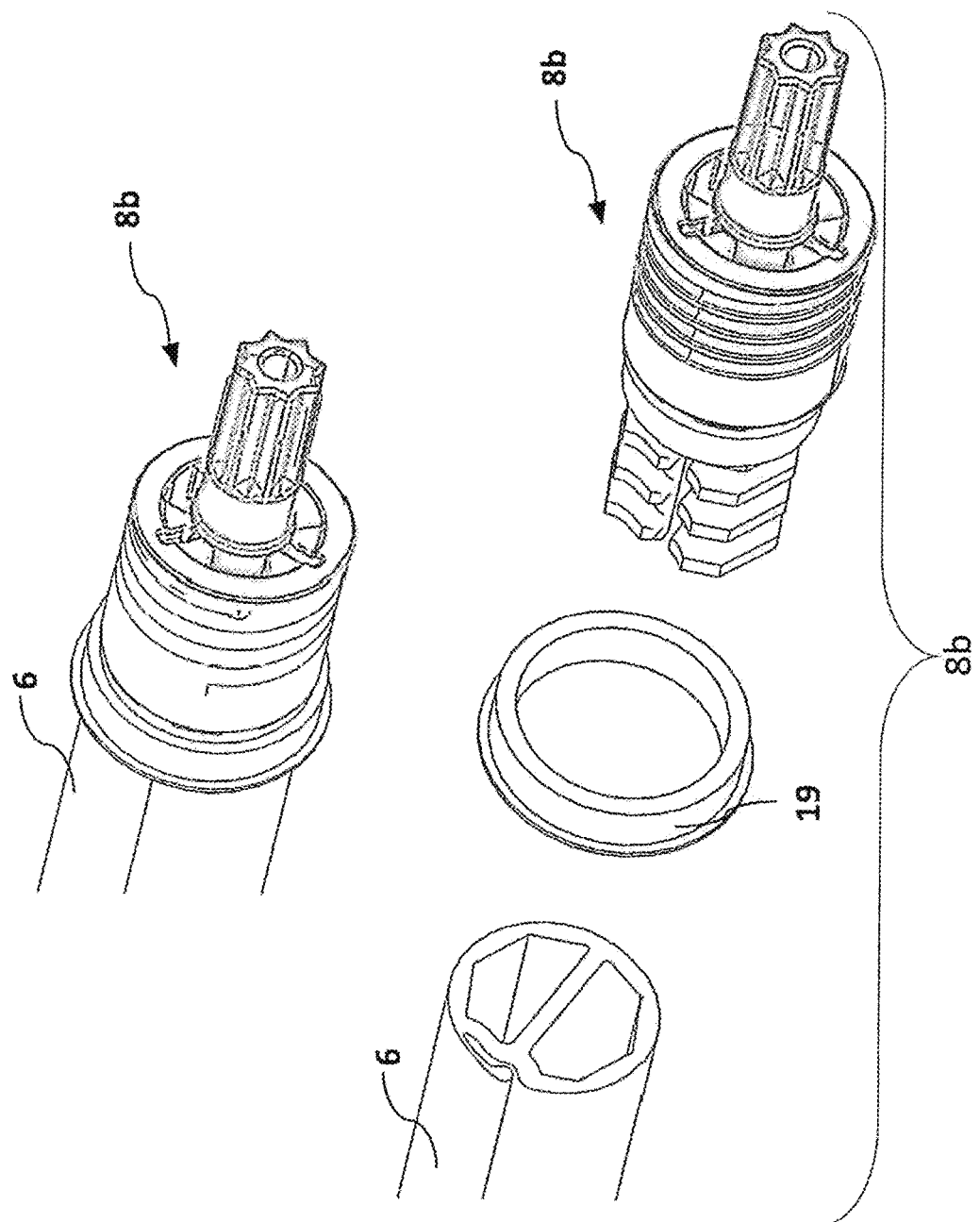
Figure 8:
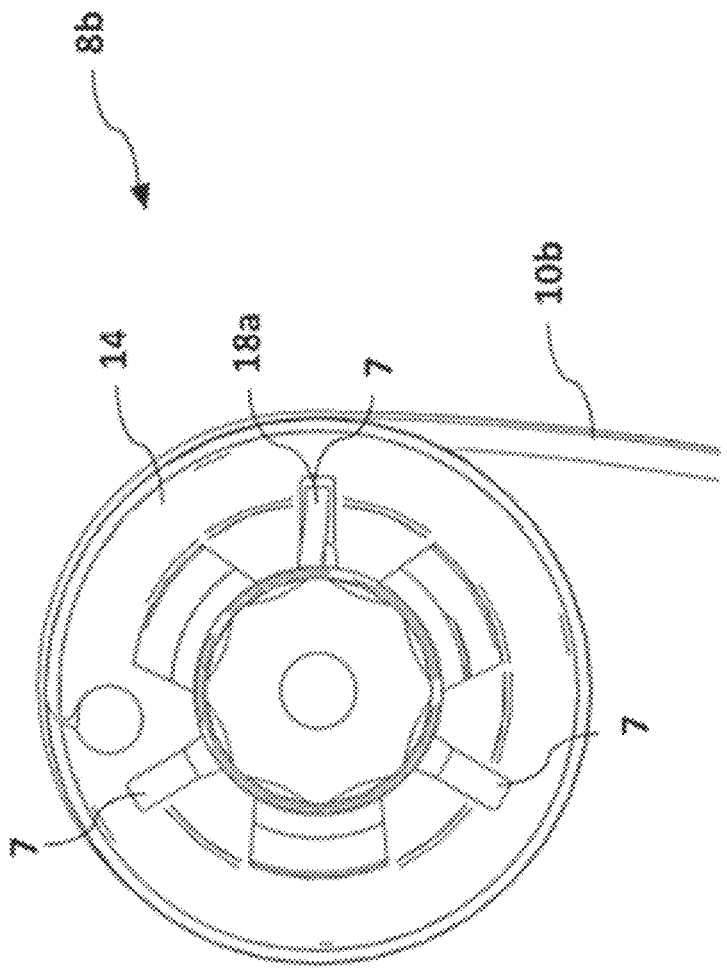
Figure 13:
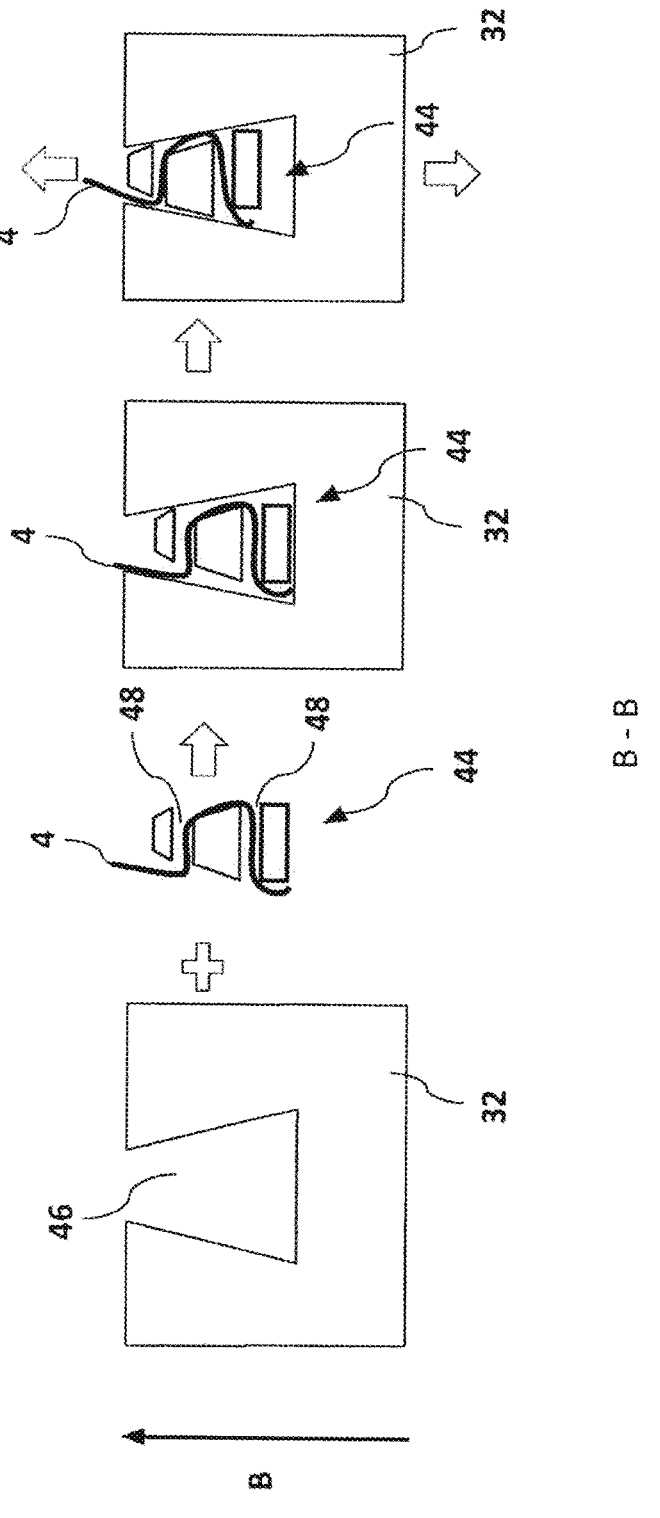
Figure 14:
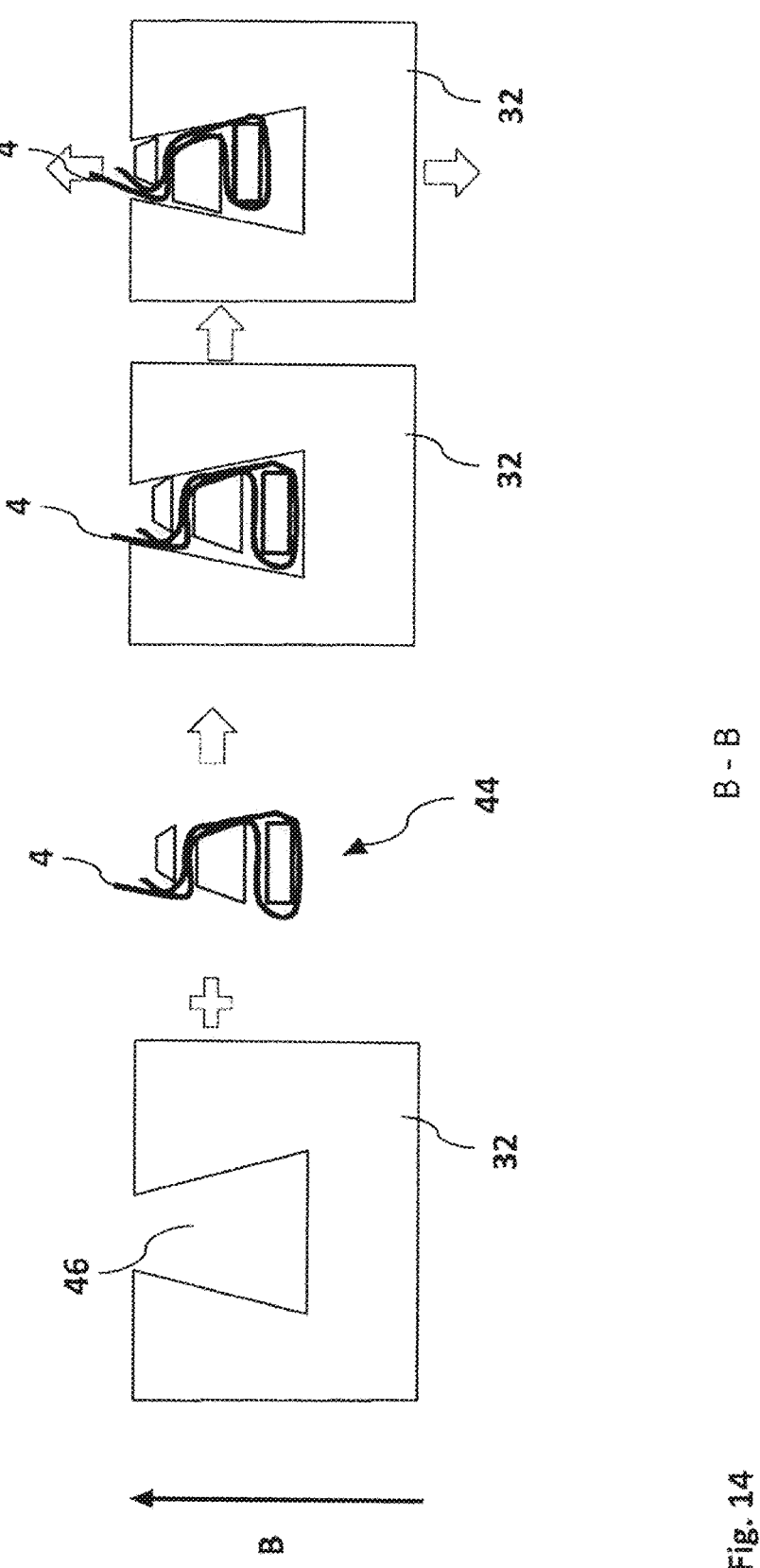
Figure 15:
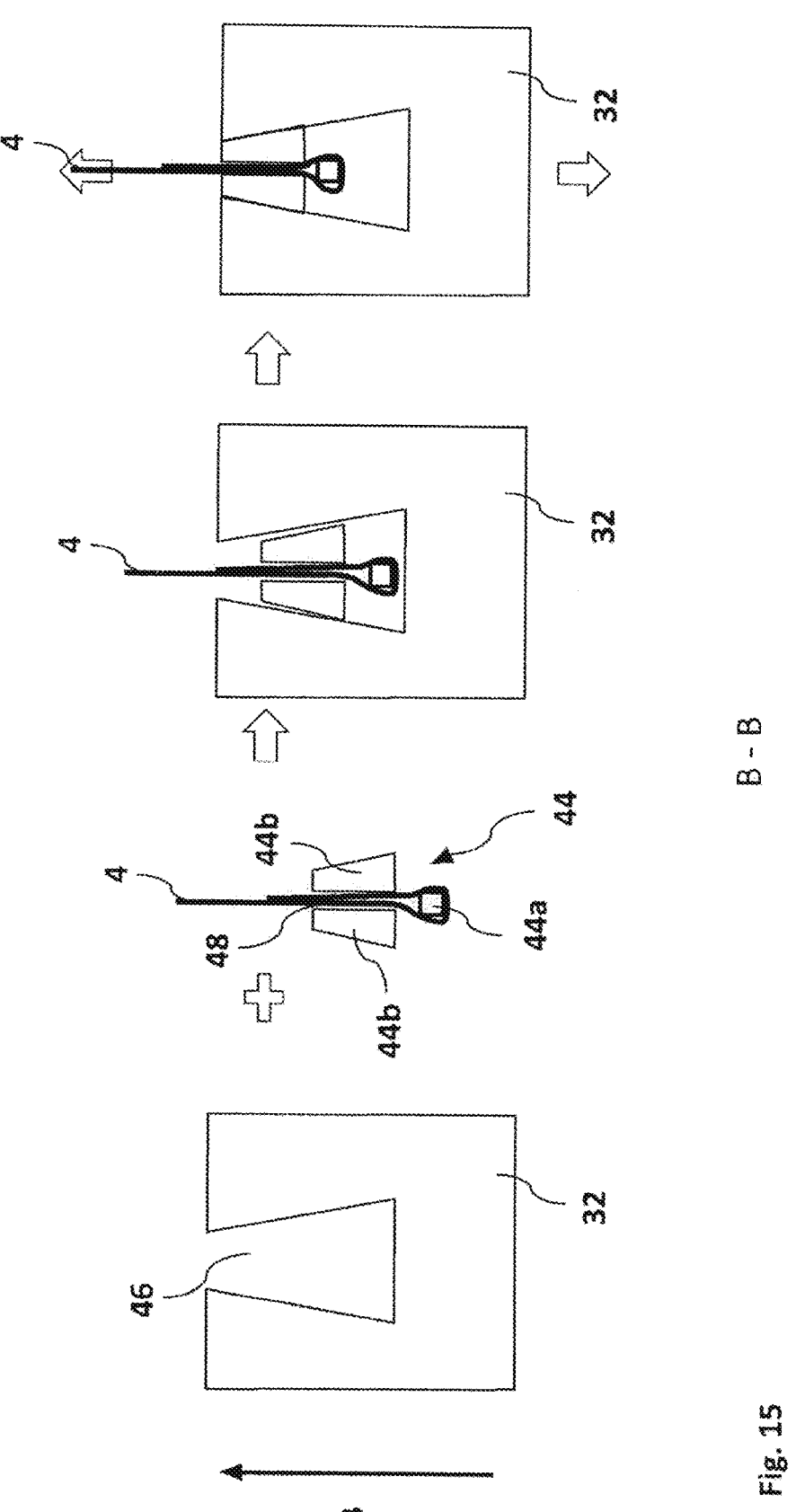
Figure 17:
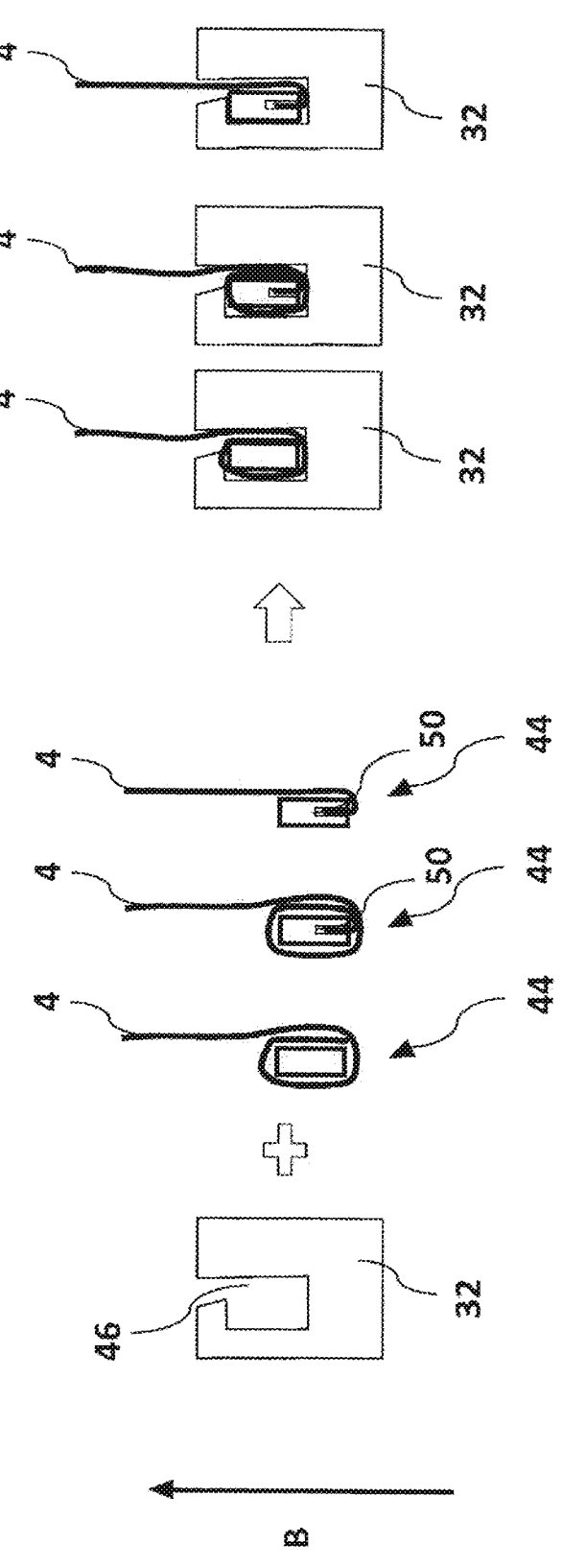

It shows:

FIG. 1 a schematic representation of a front end module of a motor vehicle, comprising a device according to the invention for regulating air flow for a front end module of a motor vehicle, FIG. 2 a schematic representation of a device according to the invention for regulating air flow for a front end module of a motor vehicle in an open state, in an exploded view according to a first embodiment, FIG. 3 a schematic representation of a device according to the invention for regulating air flow for a front end module of a motor vehicle in a closed form according to a first embodiment, FIG. 4 a schematic representation of an enlarged view of part of the device shown in FIG. 3, FIG. 5 a schematic representation of a guide means/element according to the invention for guiding a closing means/element in a spatial representation (top) and a sectional representation along a longitudinal direction (bottom) according to a first embodiment, FIG. 6 a schematic representation of a control means/element according to the invention in an assembled state (top) and a disassembled state (bottom) according to a first embodiment, FIG. 7 a schematic representation of a control means/element according to the invention together with a guide means/element according to the invention in an assembled state (top) and a disassembled state (bottom) according to a first embodiment, FIG. 8 a schematic representation of a control means/element according to the invention in a top view of the winding axis according to a first embodiment, FIG. 9 a schematic representation of a first variable diameter control means/element according to a first embodiment, FIG. 10 a schematic representation of a first control means/element with a variable diameter according to a second embodiment, FIG. 11 a schematic representation of the cross-section of the control means/elements according to the invention as shown in FIG. 9 (FIG. 11a) and FIG. 10 (FIG. 11b), FIG. 12 a schematic representation of a first control means/element having a constant diameter according to a first embodiment, FIG. 13 a schematic representation of a possibility of form-fitting fixing of a closing means/element according to a first embodiment example, FIG. 14 a schematic representation of a possibility of form-fitting fixing of a closing means/element according to a second embodiment, FIG. 15 a schematic representation of a possibility of form-fitting fixing of a closing means/element according to a third embodiment, FIG. 16 a schematic representation of a possibility of positive form-fitting of a closing means/element according to a fourth embodiment, FIG. 17 a schematic representation of a possibility of form-fitting fixing of a closing means/element according to a fifth embodiment.

FIG. 1 shows a schematic representation of a front end module 1 of a motor vehicle, comprising a device for regulating an air flow 2 for a front end module 1 of a motor vehicle according to the invention, wherein the device 2 regulates an air flow by closing air inlets 38 of the front end module 1.

FIG. 2 shows a schematic representation of a device 2 according to the invention for regulating air flow for a front end module 1 of a motor vehicle, in an exploded view according to a first embodiment. Here, the device 2 comprises a closing means/element 4 for closing air inlets 38 of a front end module of a motor vehicle, a guide means/element 6 for guiding the closing means/element 4 during an opening and a closing movement of the closing means/element 4, a first and a second control means/element 8a, 8b for controlling an opening and a closing movement of the closing means/element 4, and a first and a second drive means/element 10a, 10b for driving an opening and a closing movement of the closing means/element 4. In this regard, the first and second control means/elements 8a, 8b comprise an integrated tensioning and tolerance compensation mechanism 12 (not identifiable in the present case) formed in multiple parts for compensating a variable pretension of the first and second drive means/elements 10a, 10b in order to ensure a substantially constant tension of the closing means/element 4.

The guide means/element 6 in question can in this case be formed in particular in the form of a winding shaft onto which the closing means/element 4, which can preferably be formed in the form of a tear-resistant textile, is wound during an opening movement and from which the closing means/element 4 is unwound during a closing movement. In the present case, the guide means/element 6 is arranged between the first and second control means/elements 8a, 8b in such a way that the main alignment axis X of the guide means/element 6 is aligned essentially perpendicular to an opening movement and a closing movement of the closing means/element 4.

The first and second drive means/elements 10a, 10b are designed/configured in particular in the form of cable pulls, in this case in the form of Bowden cables, by means of which the closing means/element 4 can be wound up and unwound.

According to the present embodiment, the control means/elements 8a, 8b are preferably connected to the closing means/element 4 via the drive means/elements 10a, 10b, so that the drive means/elements 10a, 10b are wound up by the control means/elements 8a, 8b during an opening movement and unwound from the control means/elements 8a, 8b during a closing movement.

The device 2 further comprises a frame 30 for receiving the diverting means/elements 20, wherein the frame 30 in the present case comprises two lateral frame parts 31 for guiding the drive means/elements 10a, 10b as well as a lower frame part 32 for arranging a terminating strip 34.

FIG. 3 shows a schematic representation of a device 2 according to the invention for regulating air flow for a front end module 1 of a motor vehicle in a closed form according to a first embodiment.

In contrast to the illustration shown in FIG. 2, FIG. 3 shows in particular the winding spiral 13 for unwinding the drive means/elements 10a, 10b, which are part of the first and second control means/elements 8a, 8b.

FIG. 4 shows a schematic representation of an enlarged view of a part of the device 2 shown in FIG. 3, from which the winding spiral 13 of the second drive means/element 8b can be seen in even greater detail.

FIG. 5 shows a schematic representation of a guide means/element 6 according to the invention for guiding a closing means/element 4 in a spatial representation (top) and a sectional representation along a longitudinal direction (bottom) according to a first embodiment.

From FIG. 5, it can be seen in particular that the first and second control means/elements 8a, 8b have receiving means/elements 14 arranged at the ends and having a receiving region 14' for receiving the drive means/elements 10a, 10b, which in the present case are of identical design/configuration to one another.

FIG. 6 shows a schematic representation of a control means/element 8b according to the invention in an assembled state (top) and in a disassembled state (bottom) according to a first embodiment.

According to the disassembled state shown below, it can be seen that the control means/element 8b according to the invention comprises a receiving means/elements 14 arranged at the end with a receiving area 14' for receiving the drive means/elements 10a, 10b, a connecting means/elements 16b for connecting the receiving means/elements 14 to the guide means/element 6, and a tensioning and tolerance compensation mechanism 12 arranged between the receiving means/elements 14 and the connecting means/elements 16b, which tensioning and tolerance compensation mechanism 12 has an elastic means/element 18 and a front retaining point 7 and a rear retaining point 9 for fixing a front end and a back end 18a, 18b of the elastic means/element 18. In this case, the front retaining point 7 is arranged within the receiving means/elements 14 and is presently formed in the form of an elongated recess for inserting the front end 18a of the elastic means/element 18, whereas the rear retaining point 9 is arranged within the connecting means/elements 16b and is formed in the form of an elongated recess for inserting the back part 18b of the elastic means/element 18.

The receiving means/elements 14 further comprise two further front retaining points 7 for ensuring the adjustment of different spring biasing forces, which are arranged symmetrically with respect to each other in the present case. Furthermore, it can be seen from FIG. 6 that the connecting means/elements 16b comprises a limitation means/elements 17 for insertion into a limitation means/elements 17 arranged inside the receiving means/elements 14 in order to limit a working area of the elastic means/element 18. The limitation means/elements 17 of the connecting means/elements 16b may here be formed in the form of a projection, whereas the limiting means/elements of the receiving means/elements may, for example, be formed in the form of a corresponding recess. Finally, the bearing 19 can be seen, via which the connecting means/elements 16b can be connected to the guide means/element 6.

FIG. 7 shows a schematic representation of a control means/element 8b according to the invention together with a guide means/element 6 according to the invention in the assembled state (top) and in the disassembled state (bottom) according to a first embodiment.

As can be seen according to FIG. 7, the second control means/element 8b can be connected to the guide means/element 6 via the extrusion profile arranged inside the guide means/element 6 by means of the bearing 19.

FIG. 8 shows a schematic representation of a control means/element 8b according to the invention in a top view of the winding axis according to a first embodiment.

As can be seen from FIG. 8, the front retaining points 7 arranged within the receiving means/elements 14 are presently arranged symmetrically (trigonally planar) with respect to each other, so that the front part 18a of the elastic means/element 18 can also be arranged in another retaining point 7 in order to generate different spring biasing forces.

FIG. 9 shows a schematic representation of a first control means/element 8a with a variable diameter according to a first embodiment.

As can be seen according to FIG. 9, the first control means/element 8a in the present case has a barrel-shaped geometry for winding the first drive means/element 10a, which serves in particular to compensate for a diameter increase and diameter decrease of the guide means/element 6 caused by the winding and unwinding of the closing means/element 4.

FIG. 10 shows a schematic representation of a first control means/element 8a with a variable diameter according to a second embodiment example. According to the present second embodiment example, the first control means/element 8a has a frustoconical geometry for compensating for an increase and decrease in diameter of the guide means/element 6 caused by the winding and unwinding of the closing means/element 4.

FIG. 11 shows a schematic representation of the cross-section of the control means/elements according to FIG. 9 (FIG. 11a) and FIG. 10 (FIG. 11b).

Referring to FIG. 11a, it can be seen that the barrel-shaped geometry according to FIG. 9 has a parabolic cross-section with respect to the extended axis 11 of the guide means/element 6, whereas the frustoconical geometry according to FIG. 10 has a linear pitch with respect to the extended axis 11 of the guide means/element 6.

FIG. 12 shows a schematic representation of a first control means/element 8a having a constant diameter, according to a first embodiment.

The first control means/element 8a according to FIG. 12 shows a cylindrical geometry and, in contrast to the embodiment examples according to FIG. 9 and FIG. 10, no constant pitch of the winding spiral 13, but a variable pitch of the winding spiral 13, in order to achieve a compensation of a diameter increase and diameter decrease of the guide means/element 6 caused by the winding and unwinding of the closing means/element 4.

FIG. 13 shows a schematic cross-sectional view of the possibility of form-fitting fixing of a closing means/element 4 according to a first embodiment.

According to the possibility illustrated in FIG. 13, a closing means/element 4 is fixed within a lower frame part 32 of a frame 30 by means of a present three-part mounting means/element 44. For this purpose, the closing means/element 4 is inserted into a first and a second slot recess 48 of the multi-part assembly means/element 44, before the assembly means/element 44 together with the inserted part of the closing means/element 4 is inserted laterally into the recess 46 of the lower frame part 32 arranged on the longitudinal side, so that the closing means/element 4 is fixed to the frame 30 in a manner such that it cannot be lost in the loading direction B of the closing means/element 4. In the present case, the present recess 46 has a wedge-shaped configuration and the mounting means/element 44 has a shape corresponding to the wedge-shaped configuration in order to prevent the locking means/element 4 from being pulled out in the loading direction B of the locking means/element 4.

FIG. 14 shows a cross-sectional view of the possibility of positive fixing of a closing means/element 4 according to a second embodiment.

In contrast to the first embodiment shown in accordance with FIG. 13, the closing means/element 4 is guided past the first and second parts of the present three-part assembly means/element 44 on both sides in accordance with the embodiment shown in FIG. 14 for greater force transmission.

FIG. 15 shows a cross-sectional view of the possibility of form-fitting fixing of a closing means/element according to a third embodiment.

According to the third embodiment example, the mounting means/element 44 is also formed in three parts, having a first cuboidal part 44a and a second and third part 44b formed at least partially in a shape corresponding to the recess 46 of the lower frame part 32, wherein the parts 44a, 44b are presently formed relative to each other and arranged within the recess 46, in that the arrangement of the second and third parts 44b forms a slot recess 48 for the closing means/element 4 to pass through, the diameter of which gap is smaller than the diameter of the first cuboidal part 44a, so that the closing means/element 4 is prevented from being pulled out in the loading direction B of the closing means/element 4 when the cuboidal part 44a is wrapped around the closing means/element 4 and the wrapped cuboidal part 44 is arranged in the recess 46.

FIG. 16 shows a schematic cross-sectional view of the possibility of form-fitting fixing of a closing means/element 4 according to a fourth embodiment.

According to the fourth embodiment, the mounting means/element 44 comprises a recess 50 for partial insertion of the closing means/element 4, which may additionally comprise, for example, clip connections or the like not shown herein. In the context of such an embodiment, the closing means/element 4 may, for example, be wrapped around the mounting means/element 44 one or more times for secure fixing before the part of the closing means/element 4 wrapped with the mounting means/element 44 is pushed laterally into the recess 46 of the lower frame part 32.

FIG. 17 shows a schematic cross-sectional view of the possibility of form-fitting fixing of a closing means/element 4 according to a fifth embodiment.

According to this fifth embodiment example, the recess 46 arranged on the longitudinal side is not wedge-shaped but cuboid-shaped and additionally comprises a latching projection for preventing the possibility of a mounting means/element 44, which is likewise cuboid-shaped in the present case, from being passed through. According to the embodiments of FIG. 17, the mounting means/element 44 can, for example, either be simply wrapped around and inserted into a recess 50 or additionally be inserted into a recess before the part of the closing means/element 4 connected to the mounting means/element 44 is placed laterally in the recess 46. Furthermore, it is possible to attach the closing means/element 4 to the mounting means/element 44 without wrapping the mounting means/element, merely by inserting it into the recess 50.

LIST OF REFERENCE SIGNS

1 Front end module
2 Device for regulating an air flow
4 Closing means/element
6 Guide means/element
7 Front retaining point
8a First control means/element
8b Second control means/element
9 Rear retaining point
10a First drive means/element
10b Second drive means/element
11 Extended axis of the guide means/element
12 Integrated tension and tolerance compensation mechanism
13 Winding spiral
14 Receiving means/elements
14' Receiving area
16a First connecting means/element
16b Second connecting means/element
17 Limitation means/element
18 Elastic means/element 18*a* Front part of the elastic means/element
18*b* Back part of the elastic means/element
19 Bearing
20 Diverting means/element
30 Frame
31 Lateral Frame part
32 Lower frame part
34 Terminating strip
38 Air inlets
44 Mounting means/element
44*a* First cuboid part of the mounting means/element
44*b* Second and third part of the mounting means/element
46 Recess arranged on the longitudinal side
48 Slot recess
50 Recess
B Loading direction
X Main alignment axis

The invention claimed is:

1. A device for regulating an air flow for a front end module of a motor vehicle, comprising:
   a closing element for closing air inlets of the front end module of the motor vehicle,
   a guide element for guiding the closing element during an opening and a closing movement of the closing element,
   a first and a second control element for controlling the opening and the closing movement of the closing element,
   a first and a second drive element for driving the opening and the closing movement of the closing element,
   wherein the first and second control elements each comprise a multi-part integrated tension and tolerance compensation mechanism for compensating a variable pretension of the first and second drive elements to ensure a substantially constant tension of the closing element,
   wherein the first and second control elements each have a receiving element which is arranged at a respective end of the first and second control element and each receiving element has a receiving region for receiving a respective one of the first and second drive elements,
   wherein the control elements each have a connecting element for connecting the receiving elements to the guide element, it being possible for the connecting elements to be connected to the guide element,
   wherein the tension and tolerance compensation mechanism has at least one elastic element for compensating for a variable prestress,
   wherein the tensioning and tolerance mechanism has at least one front retaining point and one rear retaining point for fixing a front end and a back end of the elastic element,
   wherein the rear retaining point is arranged inside one of the connecting elements, wherein a frame is provided for receiving the diverting elements, wherein the frame comprises a plurality of support blades extending across an opening of the frame to support the closing element during closing movement, wherein more than two front or rear retaining points are provided to ensure the adjustment of different spring prestressing forces, wherein the front or rear retaining points are symmetrically arranged along a sectional plane of at least one of the receiving elements or the connecting elements.

2. The device according to claim 1, wherein the tension and tolerance compensation mechanism is operatively connected to the drive elements.

3. The device according to claim 1, wherein the spring force of the elastic element is between 28 and 22 N.

4. The device according to claim 1, wherein the at least one front retaining point is arranged on the interior of one of the receiving elements, which partially encloses the at least one front retaining point.

5. The device according to claim 1 wherein at least one of the receiving elements or connecting elements have limitation elements for limiting a working area of the elastic elements.

6. The device according to claim 1, wherein the first and second control elements are shaped in such a way that a diameter increase and diameter decrease of the guide element caused by the winding and unwinding of the closing element is compensated to minimize a difference in web speed when the guide element is wound and the drive elements are unwound and when the drive elements are wound and the guide element is unwound.

7. The device according to claim 1, wherein the first and second control elements have a varying diameter to compensate for a diameter increase and diameter decrease of the guide element caused by the winding and unwinding of the closing element.

8. The device according to claim 7, wherein the first and second control elements have a winding spiral for receiving the drive elements.

9. The device according to claim 1, wherein the first and second control elements have a constant diameter.

10. The device according to claim 9, wherein the first and second control elements have a winding spiral for receiving the drive elements, the winding spiral having a variable pitch for compensating for a diameter increase and diameter decrease of the guide element caused by the winding and unwinding of the closing element.

11. The device according to claim 1, wherein a first and a second diverting element are provided for deflecting the first and second drive elements respectively.

12. The device according to claim 1, wherein at least one of the frame or the guide element is connected to the closing element in at least a form-fitting and/or force-fitting manner, the closing element being connected releasably at least to the frame or the guide element via a clamping connection.

13. The device according to claim 1, wherein a mounting element is provided for connecting at least one of the frame or the guide element to the closing element, the mounting element having at least one slot recess for insetting the closing element.

14. The device according to claim 13, wherein the mounting element is formed in a plurality of parts.

15. The device according to claim 13, wherein at least one of the frame or the guide element has a recess, arranged on a longitudinal side, for the insertion of the closing element and of the mounting element.

16. The device according to claim 15, wherein the recess is of wedge-shaped configuration and the mounting element is configured at least partially to correspond in shape to the wedge-shaped recess, in order to prevent the closing element from being pulled out in the loading direction of the closing element.

17. The device according to claim 13, wherein the mounting element is formed in three parts, the mounting element having a first cuboidal part and a second and third part which are formed at least partially in a shape-corresponding manner with respect to the recess.

18. The device according to claim 13, wherein the mounting element has a recess for the partial insertion of the closing element.

19. The device according to claim 1, wherein the first and second drive elements are in the form of cable pulls.

20. The device according to claim 1, wherein the guide element is formed in the form of a winding shaft onto which the closing element can be wound during an opening movement and from which the closing element can be unwound during a closing movement.

21. The device according to claim 1, wherein the guide element is formed in the form of an extruded profile.

22. The device according to claim 1, wherein the guide element has two recesses arranged on the outer sides for receiving the control elements.

23. The device according to claim 15, wherein the recesses arranged on the outer sides are configured to correspond in shape to the outer shape of the control elements.

24. The device according to claim 1, wherein the guide element is formed from a lightweight material having a density of less than 3 g/cm$^3$.

25. The device according to claim 1, wherein the guide element is arranged between the first and second control elements in such a way that a main alignment axis of the guide element is aligned essentially perpendicular to an opening and closing movement of the closing element.

26. The device according to claim 1, wherein the control elements are connected to the closing element via the drive elements.

27. The device according to claim 1, wherein a drive means is provided for driving the drive elements.

28. A front end module for a motor vehicle, comprising the device according to claim 1.

29. A motor vehicle comprises the device for regulating an air flow for a front end module according to claim 1.

\* \* \* \* \*